United States Patent [19]

Erkens et al.

[11] Patent Number: 5,007,963

[45] Date of Patent: Apr. 16, 1991

[54] NOVEL PROCESS FOR THE PREPARATION OF LEAD MOLYBDATE PIGMENTS AND NOVEL LEAD MOLYBDATE PIGMENTS

[75] Inventors: Leonardus J. H. Erkens, CK Maastricht; Gerben P. Algra, RB Maastricht; Herman J. J. M. Geurts, AX Kerkrade; Hubertus P. A. Gielkens, BD Amstenrade/Schinnen, all of Netherlands

[73] Assignee: Ciba-Geigy Corporation, Ardsley, N.Y.

[21] Appl. No.: 259,083

[22] Filed: Oct. 17, 1988

[30] Foreign Application Priority Data

Oct. 22, 1987 [CH] Switzerland ............ 4133875

[51] Int. Cl.$^5$ .............................. C09C 1/20
[52] U.S. Cl. .................... 106/433; 106/455
[58] Field of Search .................. 106/433, 455

[56] References Cited

U.S. PATENT DOCUMENTS

| | | | |
|---|---|---|---|
| 1,926,447 | 9/1933 | Lederle et al. | 106/433 |
| 2,030,009 | 8/1933 | Lederle | 106/433 |
| 2,063,254 | 12/1936 | Lederle | 106/433 |
| 2,176,819 | 10/1939 | Linz et al. | 106/433 |
| 2,316,244 | 4/1943 | Huckle et al. | 106/433 |
| 2,813,039 | 11/1957 | Bishop | 106/433 |
| 3,370,971 | 2/1968 | Linton | 106/434 |
| 3,567,477 | 3/1971 | Higgins | 106/433 |
| 3,639,133 | 2/1972 | Linton | 106/434 |
| 3,772,047 | 11/1973 | Ziobrowski | 106/433 |
| 4,046,588 | 9/1977 | Einerhand et al. | 106/434 |

FOREIGN PATENT DOCUMENTS

| | | | |
|---|---|---|---|
| 510493 | 4/1976 | U.S.S.R. | 106/433 |
| 711077 | 1/1980 | U.S.S.R. | 106/433 |
| 763410 | 9/1980 | U.S.S.R. | 106/433 |
| 1137330 | 12/1968 | United Kingdom | 106/433 |

OTHER PUBLICATIONS

FIAT Final Report, No. 804, PB22628, Apr. 14, 1966.
DIN 5033, Mar. 31, 1978.
DIN 53,235, Nov. 1974.
DIN 6174, Jan. 1979.
F. Heinrich, Ausser der Reihe, No. 8/1977; p. 318.
Vogel's Textbook of Qual. Inorg. Analysis, 4th Ed., p. 472, 1978.
Vogel's Textbook of Qual. Inorg. Analysis, 4th Ed., p. 504, 1978.
ASTM, D126, pp. 46–47, 1977.

*Primary Examiner*—Theodore Morris, III
*Assistant Examiner*—George Wyszomierski
*Attorney, Agent, or Firm*—Stephen V. O'Brien

[57] ABSTRACT

A process for the preparation of lead molybdate pigments containing lead chromate, lead sulfate and lead molybdate, which comprises preparing the lead molybdate pigments by reacting an aqueous solution of a lead salt with an aqueous solution containing chromate, molybdate and sulfate salts or with an aqueous solution of each of said salts using 2 to 5 mol % of lead molybdate seed crystals, based on the total molar amount of lead chromate, lead sulfate and lead molybdate. The lead molybdate pigments so obtained are strong and are highly suitable for coloring organic materials of high molecular weight.

12 Claims, 3 Drawing Sheets

NOVEL PROCESS FOR THE PREPARATION OF LEAD MOLYBDATE PIGMENTS AND NOVEL LEAD MOLYBDATE PIGMENTS

The present invention relates to a novel process for the preparation of lead molybdate pigments and to novel lead molybdate pigments having particularly high tinting strength when applied to, or incorporated in, organic materials of high molecular weight.

Lead molybdate pigments have been used for many years, especially for colouring paints and plastics materials. They are solid solutions of tetragonal or almost tetragonal mixed crystals consisting of lead chromate, lead sulfate and lead molybdate. The orange-red hue of these compounds results from the incorporation of tetragonal lead molybdate into the crystal lattice of the lead chromate. The lead molybdate pigments range in colour from relatively light yellowish red to bluish red, the yellowish red lead molybdate pigments having a higher tinting strength.

As regards the lead molybdate component, it has been found that a minimum lead molybdate content of the order of 10 mol % is essential for preparing lead molybdate pigments which contain insignificant amounts of monoclinic lead chromate. More than 15 mol % of lead molybdate, however, results in no further improvement of the pigment properties, especially of the tinting strength. Moreover, large amounts of lead molybdate are not of economic interest, because of the high cost of the required molybdate salt (e.g. sodium molybdate).

As regards the lead molybdate content, the commercially available lead molybdate pigments are therefore a compromise and contain from 10 to 15 mol % of lead molybdate. These facts may be gleaned from the FIAT Final Report No. 804, PB 22268, U.S. Dept. of Commerce, Office of Technical Services, 1945, Molybdate Orange Pigment, and from a number of patent specifications, for example U.S. Pat. Nos. 1,926,447, 2,030,009, 2,176,819 and 3,567,477.

As a consequence of the above indicated optimum content of lead molybdate, the tinting strength of such pigments is not determined by the chemical composition, but primarily by the particle size of these pigments. In addition, the hue is also influenced by the particle size of the lead molybdate pigments, so that a small average particle size results in stronger yellowish red hues, whereas a larger average particle size leads to weaker bluish red hues.

A number of different processes have already been proposed for increasing the tinting strength and/or clarity of hue and/or light resistance of lead molybdate pigments. Thus in U.S. Pat. No. 1,926,447 and U.S. Pat. No. 2,030,009 the proposal is made to replace up to 80% of the lead content of lead molybdate pigments by barium or strontium. Although the pigments so obtained have an improved fastness to alkali with respect to weak bases, other pigment properties, such as tinting strength, are impaired.

A process for improving the red and the hiding power of lead molybdate pigments is proposed in U.S. Pat. No. 2,176,819. In this process, mixed crystals consisting of lead chromates, lead sulfate and lead molybdate are formed by using a strongly acidic solution of a soluble lead salt to precipitate mainly bluish red pigments. However, the tinting strength of these pigments is not entirely satisfactory.

The proposal has also been made in U.S. Pat. No. 3,567,477 to prepare lead molybdate pigments by combining a chromate/molybdate/sulfate solution and a lead salt solution in a jet at a linear speed of at least 16 m/sec. The lead molybdate content of these pigments is 4–9 mol %. In addition, a substantial amount of free lead chromate is present in a monoclinic crystal modification outside the solid lead chromate/lead molybdate/lead sulfate solution, resulting in a pronounced shift in hue to yellow and in a loss of clarity.

U.S. Pat. No. 3,772,047 relates to extremely dark red lead molybdate pigments. In the process of this patent, the pigment particles are precipitated in the presence of a starting solution which contains barium and zinc ions as well as a mixture of molybdate ions and at least one chromate or sulfate ion.

It has now been found that lead molybdate pigments of substantially smaller average particle size and substantially higher tinting strength than the prior art lead molybdate pigments of the same hue can be prepared by precipitating them from the appropriate aqueous lead salt, chromate salt, sulfate salt and molybdate salt solutions, in the presence of a specific amount of lead molybdate seed crystals, such that tetragonal lead chromate mixed crystals can be formed therefrom.

Accordingly, the present invention relates to a novel process for the preparation of lead molybdate pigments containing lead chromate, lead sulfate and lead molybdate, which process comprises forming said lead molybdate pigments by reacting an aqueous solution of a lead salt with an aqueous solution containing chromate salts, molybdate salts and sulfate salts, or with an aqueous solution of each of said salts, using 2 to 5 mol % of lead molybdate seed crystals, based on the total molar amount of lead chromate, lead sulfate and lead molybdate.

It is preferred to use 3 to 4 mol % of lead molybdate seed crystals.

Concerning the proportion of lead sulfate, it is customary in the relevant art to use small amounts of lead sulfate to facilitate the formation of the solid chromate/molybdate solution. It is undesirable to use more than the minimum amounts of lead sulfate, as amounts in excess of about 10 mol % result in deterioration of the tinting strength and increase the proportion of environmentally toxic acid-soluble lead. The lead molybdate pigments obtained by the process of this invention therefore contain, for example, from 2–3 mol % of lead sulfate.

The lead molybdate seed crystals employed in the process of this invention can be obtained, for example, by mixing an aqueous mixture of a lead salt, such as lead acetate and, preferably, lead nitrate, with an aqueous solution of a molybdate salt, for example ammonium molybdate and, in particular, sodium or potassium molybdate, by precipitating methods known per se. Thus, for example, both solutions can be fed simultaneously through separate lines into a reactor which may contain water, or alternatively one of the two solutions may be present in the reactor and the other is added. The preferred procedure, however, is to charge the reactor with the lead salt solution and to precipitate the lead molybdate seed crystals in the presence of an excess of lead ions. The crystals can be of any desired size. Finely particulate, uniform seed crystals are preferred, however, and the crystal size may be from 0.05 to 0.1 μm.

The pH can vary from 7.0 to 3.0 during or before the precipitation of the lead molybdate seed crystals.

In the process of this invention, it is in principle possible to feed the aqueous lead salt solution and the solution containing the chromate, molybdate and sulfate salts simultaneously into a reactor, or to react the lead salt solution with a solution containing the chromate, molybdate and sulfate salts, in which reaction the lead molybdate seed crystals may be charged to the reactor and may be present in the solution of the chromate, molybdate and sulfate salts. They can also, however, be fed as a separate suspension, simultaneously with the solution of the chromate, molybdate and sulfate salts, to the reactor.

The preferred procedure, however, is to charge the lead molybdate seed crystals in the form of an aqueous suspension to the reactor at a pH value from 3–4. This aqueous suspension can additionally contain water-soluble alkali metal salts and alkaline earth metal salts, for example NaCl, NaBr, KCl, $BaCl_2$ and $CaCl_2$ as well as $NH_4Cl$.

To prepare the yellowish red lead molybdate pigments of this invention as well as the red lead molybdate it is convenient to use alkali metal salts, preferably NaCl, whereas alkaline earth metal salts, preferably $BaCl_2$, are used to prepare the bluish red lead molybdate pigments.

A preferred process variant comprises charging the reactor with 2 to 5 mol %, preferably 3 to 4 mol %, of lead molybdate seed crystals in the form of an aqueous suspension, and then, with efficient stirring, to introduce an aqueous lead salt solution and an aqueous solution containing a water-soluble chromate, sulfate and molybdate salt simultaneously through two separate lines.

The aqueous lead salt solution is, for example, a lead acetate solution, preferably a lead nitrate solution, and the aqueous chromate solution is, for example, a sodium or potassium chromate solution, most preferably a sodium chromate solution. The aqueous sulfate solution is, for example, a potassium or ammonium sulfate solution, preferably a sodium sulfate solution, and the molybdate solution is a sodium molybdate, potassium molybdate or ammonium molybdate solution, preferably a sodium molybdate solution. The concentration of the lead salt solution and of the solution of the chromate salt or of the chromate, sulfate and molybdate salts may vary within a wide range. In general, the concentrations will be about 0.3 to 1.2 mol of lead salt per liter, 0.5 to 6 mol of chromate salt, 0.2 to 2.3 mol of molybdate salt and 0.02 to 0.7 mol of sulfate salt, per liter. Lower concentrations can be economically disadvantageous, whereas it is usually difficult to obtain uniform precipitations when using higher concentrations.

The preferred starting material for the chromate solution is sodium bichromate.

The solution of chromate, sulfate and molybdate salts conveniently contains 9 to 15 mol %, preferably 10 to 12 mol %, of lead molybdate, based on the total molar amount of lead chromate, lead sulfate and lead molybdate.

A substantial range of process variants is possible for the conditions applied for the reaction/precipitation. In general, the reaction is carried out by mixing or introducing the different aqueous solutions, with efficient stirring, in the temperature range from 15° to 35° C., preferably from 18° to 21° C., while keeping the pH in the acid range, preferably from 2.2 to 4.0, when combining the solutions and after the reaction. Bluish red lead molybdate pigments are normally obtained in the pH range from 2.2 to 2.7, whereas yellowish red lead molybdate pigments are obtained in the pH range from 3.4 to 4.0.

Depending on the size of the batch, the total reaction time is usually up to 1 hour.

The reaction is preferably carried out at room temperature and in the pH range from 2.5 to 4, conveniently in the presence of an excess of lead ions of 0.001 to 0.005 mol per liter over the stoichiometric amount.

Efficient stirring can be effected, for example, by mechanical stirring with conventional agitators, for example impellers or propeller mixers.

To improve the pigment properties, for example the stability to heat, light and attack by chemicals, it is expedient to provide the pigment particles with a protective coating during precipitation or by an aftertreatment by known methods, for example those described in U.S. Pat. Nos. 3,370,971, 3,639,133 and 4,046,588. To this end, a coating of an inorganic compound is deposited on to the lead molybdate pigments during or after precipitation or by an aftertreatment. Examples of inorganic compounds are compounds of aluminium, tin, titanium, antimony, cerium, zirconium, boron or silicon or mixtures thereof.

It is preferred to coat the pigment particles with an aluminium/silicate coating which can be obtained, for example, by adding an aqueous solution of an alkali metal silicate and an aqueous solution of an aluminium salt to the aqueous pigment suspension.

The amount of coating compound is conveniently 2 to 40%, preferably 2 to 20% and, most preferably, 3 to 10%, based on the total weight of the pigment.

The invention further relates to novel yellowish red lead molybdate pigments containing lead chromate, lead sulfate and having a lead molybdate content of 9 to 15 mol %, based on the total molar amount of lead chromate, lead molybdate and lead sulfate, which pigments are characterised by the tristimulus values X, Y and Z determined in accordance with DIN 5033 which lie within the colour space bounded by the coordinates $25.9 \leq X \leq 27.8$, $15.1 \leq Y \leq 16.2$ and $1.12 \leq Z \leq 1.35$ or, if coated with antimony(III), lie within the colour space bounded by the coordinates $23.3 \leq X \leq 24.9$, $13.8 \leq Y \leq 14.6$ and $1.02 \leq Z \leq 1.30$, which lead molybdate pigments are prepared using 2 to 5 mol % of lead molybdate seed crystals, based on the total molar amount of lead chromate, lead sulfate and lead molybdate, and which have, as colorimetric parameters, a tinting strength value C at standard depth of shade 1/25 in accordance with DIN 53 235 and a hue value b determined in accordance with DIN 6174 that lie within the area defined by the following coordinates:

C=0.077 at b=58.4,
C=0.056 at b=66.1,
C=0.037 at b=66.1 and
C=0.051 at b=61.3 or, if coated with antimony(III), by the coordinates

C=0.083 at b=57.4,
C=0.078 at b=62.2,
C=0.061 at b=62.2 and
C=0.063 at b=58.4.

The invention further relates to novel red lead molybdate pigments containing lead chromate, lead sulfate and having a lead molybdate content of 9 to 15 mol %, based on the total molar amount of lead chromate, lead molybdate and lead sulfate, which pigments are characterised by the tristimulus values X, Y and Z determined in accordance with DIN 5033 which lie within the colour space bounded by the coordinates $22.7 \leq X \leq 25.9$, $12.9 \leq Y \leq 15.1$ and $1.12 \leq Z \leq 1.46$ or, if coated with antimony(III), lie within the colour space bounded by the coordinates $22.2 \leq X \leq 23.3$, $12.8 \leq Y \leq 13.8$ and $1.10 \leq Z \leq 1.36$, which lead molybdate pigments are prepared using 2 to 5 mol % of lead molybdate seed crystals, based on the total molar amount of lead chromate, lead sulfate and lead molybdate, and which have, as colorimetric parameters, a tinting strength value C at standard depth of shade 1/25 in accordance with DIN 53 235 and a hue value b determined in accordance with DIN 6174 that lie within the area defined by the following coordinates:

C=0.077 at b=58.4,
C=0.122 at b=55.9,
C=0.096 at b=64.6 and
C=0.060 at b=64.6 or, if coated with antimony(III), by the coordinates

C=0.120 at b=55.1,
C=0.114 at b=61.4,
C=0.079 at b=61.4 and
C=0.083 at b=57.4.

The invention further relates to novel bluish red lead molybdate pigments containing lead chromate, lead sulfate and having a lead molybdate content of 9 to 15 mol %, based on the total molar amount of lead chromate, lead molybdate and lead sulfate, which pigments are characterised by the tristimulus values X, Y and Z determined in accordance with DIN 5033 which lie within the colour space bounded by the coordinates $21.5 \leq X \leq 22.7$, $12.0 \leq Y \leq 12.9$ and $1.12 \leq Z \leq 1.40$ or, if coated with antimony(III), lie within the colour space bounded by the coordinates $18.5 \leq X \leq 22.2$, $10.5 \leq Y \leq 12.8$ and $1.10 \leq Z \leq 1.35$, which lead molybdate pigments are prepared using 2 to 5 mol % of lead molybdate seed crystals, based on the total molar amount of lead chromate, lead sulfate and lead molybdate, and which have, as colorimetric parameters, a tinting strength value C at standard depth of shade 1/25 in accordance with DIN 53 235 and a hue value b determined in accordance with DIN 6174 that lie within the area defined by the following coordinates:

C=0.122 at b=55.9,
C=0.169 at b=54.7,
C=0.152 at b=59.9 and
C=0.110 at b=59.9 or, if coated with antimony(III), by the coordinates

C=0.120 at b=55.1,
C=0.118 at b=57.2,
C=0.220 at b=49.0 and
C=0.215 at b=51.5.

The colorimetric characterisation of the lead molybdate pigments of this invention can be illustrated by the yellowish red lead molybdate pigments shown in FIG. 1 by plotting the above defined colorimetric parameters C and b on the ordinate and abscissa respectively. Accordingly, one aspect of the present invention comprises all yellowish red lead molybdate pigments which are inside the areas shown in the figure, in which each area is defined by the colorimetric parameters C and b defined herein in conjunction with the colour coordinates X, Y and Z. The tristimulus values and the colorimetric parameters C and b are obtained from the measurement of various lacquer coatings with individual pigments by standard methods, the values C and b being expressed in relation to the tristimulus values, as will be explained below.

The yellowish red lead molybdate pigments of this invention belong to the class of "light molybdate pigments", as they are often called by the person skilled in the art, whereas the red lead molybdate pigments belong to the class of "medium molybdate pigments", and the bluish red lead molybdate pigments belong to the class of "dark molybdate pigments".

With the exception of the lead molybdate pigments coated with antimony(III), the other suitable coatings have almost no, or only a very insignificant, effect on the colour coordinates X, Y and Z of the lead molybdate pigments so coated.

On the other hand, the compound coated with antimony(III) affects hue and tinting strength so greatly that the lead molybdate pigments so coated differ colorimetrically greatly from the other lead molybdate pigments of the invention, for which reason they are also defined separately colorimetrically (tristimulus values X, Y, Z and tinting strength C and hue value b). The reason for this change in hue is a redox reaction between the hexavalent chromium in the chromate ion and the trivalent antimony.

The coated lead molybdate pigments can additionally be treated with texture-improving agents, for example with long-chain aliphatic alcohols, esters, acids or salts thereof, amines, amides, waxes or resin-like substances such as abietic acid, hydrogenation products thereof, esters or salts, and also with organic non-ionic, anionic or cationic surface-active agents.

The working up of the lead molybdate pigments obtained according to the invention is carried out in conventional manner, for example by filtration, washing the filter cake with water to remove soluble salts, drying and pulverising.

The tristimulus values X, Y and Z of the lead molybdate pigments of the invention are determined in accordance with DIN 5033.

The tinting strength C of the lead molybdate pigments of the invention is expressed by that ratio of coloured pigment incorporated in a lacquer to white pigment which leads to the standard depth of shade 1/25 according to DIN 53 235. This ratio thus indicates the amount of coloured pigment which, when mixed with 1 gram of white pigment, makes it possible to prepare a lacquer coating at the standard depth of shade 1/25.

As already mentioned, hue and tinting strength are determined by the particle size of the pigment, so that the tinting strength is strongly dependent on the hue. This hue dependency can be defined by means of the tristimulus values X, Y and Z in conjunction with the hue value b of the CIELAB formula according to DIN 6174. This CIELAB formula characterizes the yellow/blue axis for red hues and is fully described in the article "Ausser der Reihe" by Dr. F. Heinrich, Defazet 31, volume No. 8/1979, p. 318–324.

The lead molybdate pigments obtained according to the invention further have excellent resistance to light and weathering and also high saturation together with high tinting strength. Despite their particle fineness, they are further distinguished by the good flow properties of the printing inks and lacquers prepared therefrom. Furthermore, and depending on the coating agent, they have good resistance to industrial atmosphere (for example $SO_2$) and they have a low content of acidic soluble lead.

The lead molybdate and lead sulfate content is determined after the pigments have been decomposed according to the methods described in "Volgel's Textbook of Quantitative Inorganic Analysis", 4th edition, by J. Basset, R. C. Denney, G. H. Jeffery and J. Mendham (Longman; New York, 1978).

The lead chromate content is determined after the pigments have been decomposed in accordance with ASTM D 126, p. 46–47 (1977).

The lead molybdate pigments obtained according to the invention can be used individually or in admixture with one another or with other pigments, for example chromium yellow, titanium dioxide or organic red pigments, for pigmenting organic material of high molecular weight, for example cellulose ethers and cellulose esters, acetyl cellulose, nitrocellulose, natural resins or synthetic resins such as polymerization or condensation resins, for example aminoplasts, in particular urea and melamine/formaldehyde resins, phenolic resins, alkyd resins, polyolefins such as polyethylene or polypropylene, and also polystyrene, polyvinyl chloride, polyacrylonitrile, polyacrylic esters, polycarbonates, rubber, casein, silicone and silicone resins.

The high molecular weight compounds can be in the form of plastics materials or melts or in the form of spinning solutions, coating materials and printing inks. Depending on the end use, it is advantageous to use the novel pigments as toners or in the form of preparations. The lead molybdate pigments obtained according to the invention can be used, for example, in an amount of 0.1 to 30% by weight, based on the organic material of high molecular weight to be pigmented.

DESCRIPTION OF THE PREFERRED EMBODIMENTS

Figure 1:
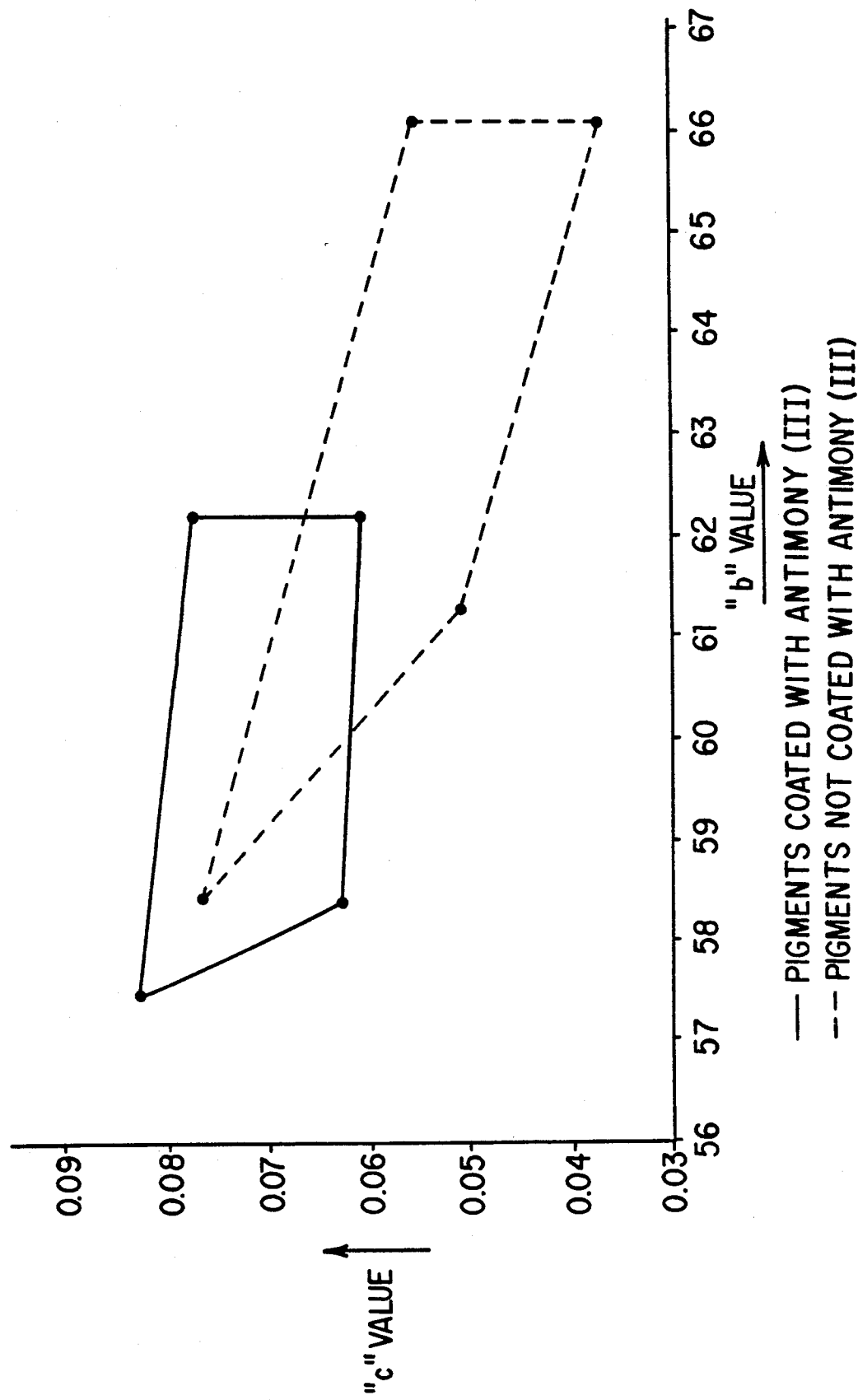
FIG. 1 is a graph showing the colorimetric parameters of yellowish red lead molybdate pigments according to the present invention.

The lacquer coatings required for the determination of the tristimulus values and the tinting strength C are prepared as follows:

A. Method of preparing the full shade lacquer (to determine the tristimulus values X, Y and Z).

To determine the tristimulus values X, Y and Z, the lacquer coatings are prepared as follows:
The following ingredients are put, in succession, into a 100 ml glass beaker:
  70 g of glass beads (diameter 3 mm)
  30.0 g of dispersing medium and
  21.0 g of colour pigment.
The dispersing medium comprises:
  28.6% of Setal ® 84 XX 70 (ex Synthese, NL), and
  71.4% of xylene.

Dispersing effected by shaking the glass beaker and the contents thereof for 15 minutes in a "Red Devil" paint shaker (ex Internatio-Alchemy). Then 62.0 g of binder are added and the batch is dispersed once more for 5 minutes in the "Red Devil" paint shaker. The binder consists of:
  53.9% of Setal ® 84 XX 70 (ex Synthese Co., NL)
  29.0% of Setamine ® U.S. 132 BB 70 (ex Synthese Co., NL)
  1.0% of emulsifier (1.0% of Baysilon Oel ® A, ex Bayer Co. and 99% of xylene),
  3.2% of n-butanol (puriss.) and
  12.9% of solvent (Solvesso ® 100, ex Esso Co.).

B. Procedure for preparing the lacquer extended with white pigment

To determine the tinting strength, a coating is prepared in the same manner as described above, except that, instead of 21.0 g of colour pigment, only the amount of colour pigment required for adjusting the standard depth of shade of 1/25 and, in addition, 21.0 g of titanium dioxide (Type RCR-2, available from Tioxide) are added.

C. Preparation of the lacquer coatings

The full shade lacquer and the lacquer extended with white pigment are sprayed on to sheet metal.
Details:
  Spraying pressure: 2.5 bar;
  film thickness (dry): 80 microns;
  evaporation: 30 min. (room temp.);
  stoving time: 20 min. at 130° C.

The metal sheets are sprayed once more, so that finally a 160 micron lacquer film (dry film thickness) is applied.

D. Colorimetry

The colour measurements are carried out by testing the lacquer coatings. The tristimulus values X, Y and Z and the tinting strength are determined by testing the lacquer films only on a white ground. To determine the opacity factor $Y_{black}/Y_{white}$, measurements are carried out by assessing the lacquer films on a black and on a white ground.

The measurement of the 16 reflectance values and the determination of the tristimulus values X, Y and Z are made in accordance with DIN 5033 for standard type of light D 65 and 10° standard observation, including gloss.

The determination of the tinting strength in accordance with DIN 53 235 has already been discussed above.

TECHNICAL DATA OF THE MEASURING APPARATUS spectrophotomoter: Zeiss RFC-3 ®
geometry: d/8°
aperture: 30 mm
wavelength: 400–700 nm, every 20 nm.

CALIBRATION

The white standard is prepared from $BaSO_4$ for colorimetry (Merck). To this end a tablet is pressed and the measured values are entered as absolute values. The black standard (Zeiss) is a tube lined with velvet and sealed at one end (reflectance value 0%).

Figure 2:
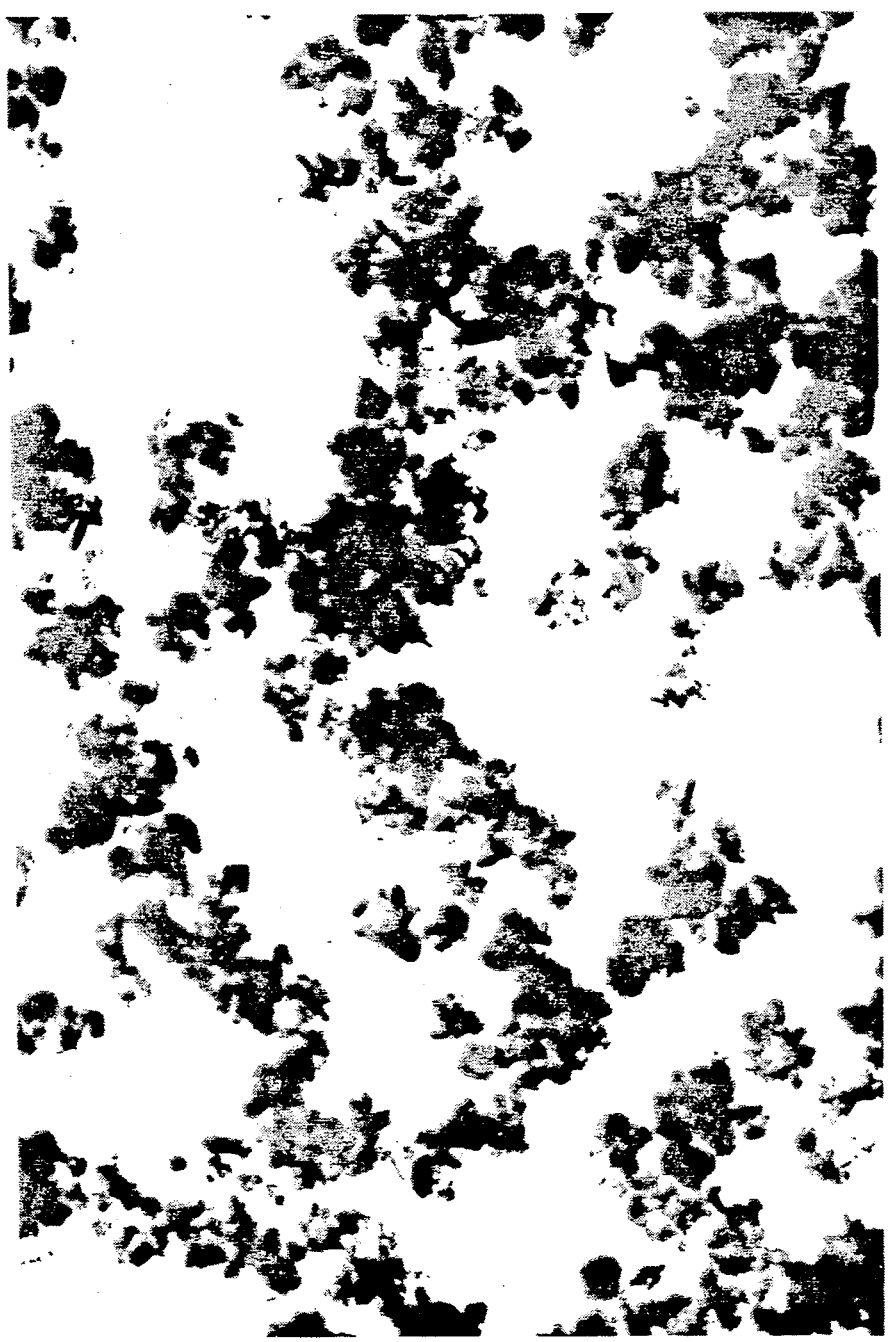
FIGS. 2 and 3 are electron microphotographs showing the size and shape of particles of pigments according to the invention.
Figure 3:
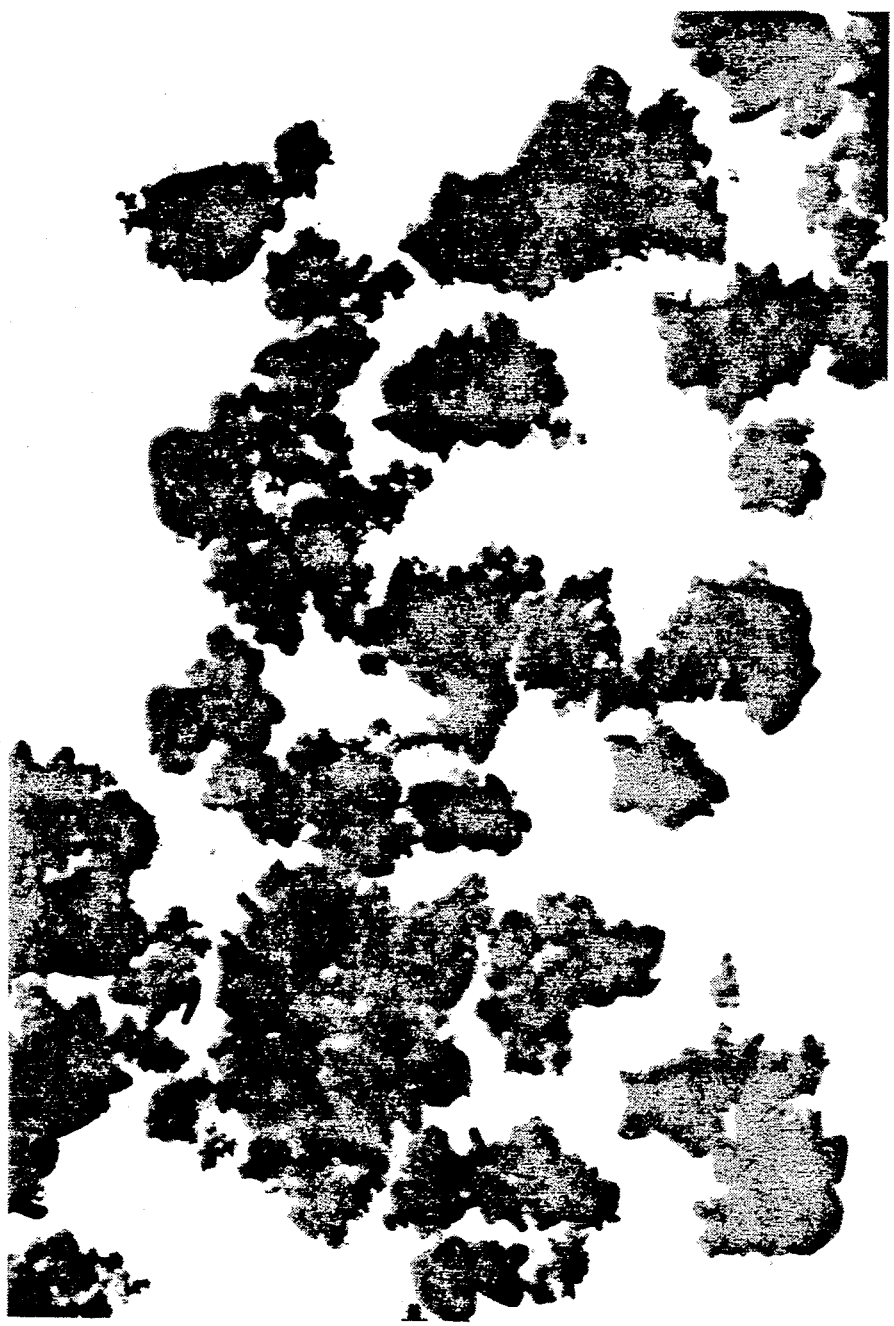

The lead molybdate pigments of ths invention are finely particulate and have a uniform particle shape and size as illustrated by electron micrographs according to Examples 1 and 2a (FIG. 2, FIG. 3).

They are distinguished by good rheological properties, a high tinting strength, good hiding power and also high saturation.

In the following Examples and in the description, parts and percentages are by weight, unless otherwise stated.

EXAMPLE 1

In a 5-liter reaction vessel, 5.0 g of sodium chloride and 3.8 g of sodium molybdate ($Na_2MoO_4 \cdot 2H_2O$) are dissolved in 2400 ml of water. The temperature is adjusted to 20° C. ±2° C. and the pH to 4.0±0.2. The lead molybdate seed crystals are formed by adding 14 g of lead nitrate (dissolved in 100 ml of water), with efficient stirring. A solution of 184.8 g of lead nitrate in 580 ml of water and a solution of 75.4 g of sodium dichromate ($Na_2Cr_2O_7 \times 2H_2O$), 14.0 g of sodium molybdate ($Na_2MoO_4 \times 2H_2O$), 1.8 g of sodium sulfate (anhydrous) and 21.0 g of sodium hydroxide (100%) in 600 ml of water are then simultaneously run over 55 minutes with efficient stirring into the suspension so obtained. During the mixing, the pH is adjusted to $3.7 \pm 0.1$.

During the addition, the excess of lead nitrate is adjusted to 2.3 g of $Pb^{2+}$ per liter and the temperature of the two solutions to $20° C. \pm 2° C$. After precipitation, the excess of lead nitrate is adjusted to 0.5 g of $Pb^{2+}$ per liter using the remaining sodium chromate/molybate/sulfate solution (about 20 ml). The resulting product is then coated by addition of 21.5 g of neutral silica in 120 ml of water, followed by 17.6 g of sodium bicarbonate and then 17.6 g of $Al_2(SO_4)_3 \times 14H_2O$ in 120 ml of water.

After addition of this solution, the final pH is adjusted to 6.0–6.5 and the precipitate is isolated from the reaction medium by filtration, washed free from soluble salts with water and dried at a temperature of 80°–90° C. over a period of 18 hours.

Composition of the mixed crystal: 84% of $PbCrO_4$, 2.0% of $PbSO_4$ and 13.9% of $PbMoO_4$.

Percentage of the coating relative to the total weight of the pigment: 4.5%.

The tristimulus values are X 26.2, Y 15.2 and Z 1.16, the hue value b is 62.5 and the tinting strength at standard depth of shade 1/25 according to DIN 53 235 is 0.066 (yellowish red lead molybdate).

FIG. 2 shows an electron micrograph of the pigment particles dispersed for a few seconds by sonication in a 50% ethyl alcohol/water mixture at a magnification of 20000.

EXAMPLE 1a

The process according to Example 1 above is repeated, except that the pH during the mixing is adjusted to $3.1 \pm 0.1$ instead of $3.7 \pm 0.1$.

Composition of the mixed crystal so obtained: 84.1% of $PbCrO_4$, 2.0% of $PbSO_4$ and 13.9% of $PbMoO_4$.

Percentage of the coating relative to the total weight of the pigment: 4.5%.

The tristimulus values are X 24.2, Y 14.0 and Z 1.23, the hue value b is 58.6 and the tinting strength at the standard depth of shade 1/25 according to DIN 53 235 is 0.111 (red lead molybdate).

EXAMPLE 1b

The process according to Example 1 above is repeated, except that the pH during the mixing is adjusted to $3.5 \pm 0.1$ instead of $3.7 \pm 0.1$.

Composition of the mixed crystal obtained and the percentage of the coating as in Example 1.

The tristimulus values are X 26.2, Y 15.3 and Z 1.18, the hue value b is 62.5 and the tinting strength at the standard depth of shade 1/25 according to DIN 53 235 is 0.063.

EXAMPLE 1c

The process according to Example 1 is repeated, except that the pH during the mixing is adjusted to $3.3 \pm 0.1$ instead of $3.7 \pm 0.1$.

Composition of the mixed crystal so obtained: 84.1% of $PbCrO_4$, 2.0% of $PbSO_4$ and 13.9% of $PbMoO_4$.

Percentage of the coating relative to the total weight of the pigment: 4.5%.

The tristimulus values are X 25.4, Y 14.6 and Z 1.20, the hue value b is 60.5 and the tinting strength at the standard depth of shade 1/25 according to DIN 53 235 is 0.095 (red lead molybdate).

Determination of the lead chromate, lead sulfate and lead molybdate content

The lead chromate content is determined by the following procedure:

0.250 g of pigment is put into a 300 ml Erlenmeyer flask with ground stopper. Then 10 ml of 4N sodium hydroxide solution are added and the mixture is heated until the lead chromate is completely dissolved. The mixture is diluted with 40 ml of distilled water and cooled to room temperature. Then 0.5 g of sodium carbonate (anhydrous), 4.0 g of potassium iodide and 30 ml of 4N hydrochloric acid are added. The Erlenmeyer flask is immediately sealed with the stopper and, if necessary, cooled.

The mixture is then left to stand for 2 hours in the dark and shaken from time to time. Then 80 ml of distilled water and 0.5 g of sodium carbonate (anhydrous) are added and the mixture is titrated with sodium thiosulfate. Starch flour is added near the end point of the titration.

The lead sulfate content is determined by the following procedure:

0.5 to 1.0 g of pigment is weighed very exactly. Together with 6.0 g of sodium carbonate, the pigment is put into a 150 ml glass beaker and mixed, and then 50 ml of hot water are added. The mixture is boiled until the pigment is completely dissolved. Then another 50 ml of hot water are added and the glass beaker is placed for ½ hour on a water bath (90°–95° C.). The mixture is filtered and the filtrate is washed with a 1% solution of sodium carbonate. The filtrate is put into a 600 ml glass beaker and cautiously neutralised with hydrochloric acid until change of colour takes place, and another 10 ml of hydrochloric acid are subsequently added. Then 10 ml of 3% hydrogen peroxide are added and the mixture is boiled for 10 minutes until the chromate is reduced to trivalent chromium. Then 50 ml of glacial acetic acid are added and the mixture is diluted to a volume of about 400 ml.

The solution is heated to 100° C. and then 50 ml of a boiling 0.1N solution of barium chloride are added rapidly. The mixture is analysed for excess barium and heated for 2 hours on a water bath. The barium sulfate precipitate is filtered (MN 640 d filter) and washed free of chloride with HCl (1:99) and hot water. The precipitate is dried at 105°–110° C. and incinerated and roasted at 800° C. to constant weight.

The lead molybdate content is determined by the following procedure:

1.0 g of the pigment according to the invention is weighed very accurately. The pigment is mixed in a 400 ml beaker together with 40 ml of concentrated nitric acid and 10 ml of water. The mixture is boiled until the pigment is dissolved completely. The solution is cooled and 10 ml of concentrated sulfuric acid are added. The resulting mixture is evaporated in a sand bath until white fumes evolve, then cooled again, and subsequently 100 ml of water are added cautiously. The mixture is heated to dissolve the soluble salts and then filtered (filter MN-640 d).

The residue is then washed with a 9% solution of sulfuric acid and then with water. The filtrate is mixed in a 600 ml beaker with 25 ml of sodium hydroxide solution (10N), ensuring that the solution remains acid.

The solution is concentrated to 50 ml, and 25 ml of 4N hydrochloric acid and 25 ml of ethanol (96%, for analysis) are added. The mixture is heated in a water bath until the chromate is reduced to the trivalent chromium. 10 g of complexone in the solid form (ethylenediamine tetraacetic acid, sodium salt) are then added and the mixture is stirred until the complexone is almost dissolved. 10 ml of acetic acid (80%) and about 30 ml of 10N sodium hydroxide solution (up to a pH of 4) are then added. The mixture is diluted to 100 ml and then heated to 100° C. 15 ml of oxime solution (8-hydroxyquinoline in 85 ml of glacial acetic acid) are then added and the mixture is heated in a water bath for one hour. The residue is filtered over a weighed G4 frit and washed with hot water. The residue is dried at 130°-140° C. to constant weight.

EXAMPLE 2

In a 5-liter reaction vessel, 5 g of sodium chloride and 14.0 g of lead nitrate are dissolved in 2400 ml of water. The temperature is adjusted to 20° C.±2° C. and the pH to 4.0±0.2. The lead molybdate seed crystals are formed by adding 3.8 g of sodium molybdate ($Na_2MoO_4 \times 2H_2O$) in 80 ml of water with efficient stirring. A solution of 184.8 g of lead nitrate in 580 ml of water and a solution of 75.4 g of sodium dichromate ($Na_2Cr_2O_7 \times 2H_2O$), 14.0 g of sodium molybdate ($Na_2MoO_4 \times 2H_2O$), 1.8 g of sodium sulfate (anhydrous) and 21.0 g of sodium hydroxide (100%) in 600 ml of water are then simultaneously run over 55 minutes with efficient stirring into the suspension so obtained. During the mixing, the pH is adjusted to 3.7±0.1. During the addition, the excess of lead nitrate is adjusted to 2.3 g of $Pb^{2+}$ per liter and the temperature of the two solutions to 20° C.±2° C. After precipitation, the excess of lead nitrate is adjusted to 0.5 g of $Pb^{2+}$ per liter using the remaining sodium chromate/molybdate/sulfate solution (about 20 ml). The resulting product is then coated by the addition of 21.5 g of neutral silica in 120 ml of water, followed by 17.6 g of sodium bicarbonate and then 17.6 g of $Al_2(SO_4)_3 \times 14H_2O$ in 120 ml of water.

After addition of this solution, the final pH is adjusted to 6.0-6.5. The precipitate is isolated from the reaction by filtration, washed free from soluble salts and dried at a temperature of 80°-90° C.

Composition of the mixed crystal: 84.1% of $PbCrO_4$, 2.0% of $PbSO_4$ and 13.9% of $PbMoO_4$.

Percentage of the coating relative to the total weight of the pigment: 4.5%.

The tristimulus values are X 26.4, Y 15.5 and Z 1.17, the hue value b is 63.1 and the tinting strength at the standard depth of shade 1/25 according to DIN 53 235 is 0.053 (yellowish red lead molybdate).

EXAMPLE 2a

The process according to Example 2 above is repeated, except that the pH during the mixing is adjusted to 3.1±0.1 instead of 3.7±0.1.

Composition of the mixed crystal so obtained: 84.1% of $PbCrO_4$, 2.0% of $PbSO_4$ and 13.9% of $PbMoO_4$.

Percentage of the coating relative to the total weight of the pigment: 4.5%.

The tristimulus values are X 23.8, Y 13.8 and Z 1.19, the hue value b is 58.3 and the tinting strength at the standard depth of shade 1/25 according to DIN 53 235 is 0.085 (red lead molybdate).

FIG. 3 shows an electron micrograph of the pigment particles dispersed by sonication for a few seconds in a 50% ethyl alcohol/water mixture at a magnification of 20000.

EXAMPLE 2b

The process according to Example 2 above is repeated, except that the pH during the mixing is adjusted to 3.5±0.1 instead of 3.7±0.1.

Composition of the mixed crystal obtained and percentage of the coating: as in Example 2.

The tristimulus values are X 26.0, Y 15.1 and Z 1.20, the hue value b is 61.7 and the tinting strength at the standard depth of shade 1/25 according to DIN 53 235 is 0.061 (yellowish red lead molybdate).

EXAMPLE 2c

The process according to Example 2 is repeated, except that the pH during the mixing is adjusted to 3.3±0.1 instead of 3.7±0.1.

Composition of the mixed crystal so obtained: 84.1% of $PbCrO_4$, 2.0% of $PbSO_4$ and 13.9% of $PbMoO_4$.

Percentage of the coating relative to the total weight of the pigment: 4.5%.

The tristimulus values are X 24.3, Y 14.2 and Z 1.20, the hue value b is 59.5 and the tinting strength at the standard depth of shade 1/25 according to DIN 53 235 is 0.090 (red lead molybdate).

EXAMPLE 2d

In a 5-liter reactor, 5 g of sodium chloride and 5.2 g of lead nitrate are dissolved in 2400 ml of water. The temperature is adjusted to 20° C.±2° C. and the pH to 3.5±0.2. The lead molybdate crystals are formed by adding 3.8 g of sodium molybdate ($Na_2MoO_4.2H_2O$) in 80 ml of water, with efficient stirring. Then 10.0 g of barium chloride ($BaCl_2$) are added to the suspension. Into the resultant suspension are then run simultaneously, over 55 minutes and with efficient stirring, a solution of 184.8 g of lead nitrate in 580 ml of water and a solution of 75.4 g of sodium bichromate ($Na_2Cr_2O_7.2H_2O$), 14.0 g of sodium molybdate ($Na_2MoO_4.2H_2O$), 1.8 g of sodium sulfate (anhydrous) and 21.0 g of 100% sodium hydroxide in 600 ml of water. During the mixing, the pH is adjusted to 2.6±0.05. During the addition the excess of lead nitrate is adjusted to 2.3 g of $Pb^{2+}$ per liter, and the temperature of the two solutions is adjusted to 20° C.±2° C. After precipitation, the excess of lead nitrate is adjusted to 0.5 g of $Pb^{2+}$ per liter with the remaining sodium chromate/molybdate/sulfate solution (ca. 20 ml). Subsequently the resutlant product is coated by addition of 21.5 g of neutral sodium silicate in 120 ml of water, followed by 17.6 g of sodium bicarbonate and then 17.6 g of $Al_2(SO_4)_3.14H_2O$ in 120 ml of water.

The final pH after addition of this solution is adjusted to 6.0-6.5. The precipitate is then isolated from the reaction medium by filtration, washed free from soluble salts, and dried at a temperature of 80°-90° C.

Composition of the mixed crystal: 84.1% of $PbCrO_4$, 2.0% of $PbSO_4$, and 13.9% of $PbMoO_4$.

Percentage of coating relative to the total weight of the pigment: 4.5%.

The tristimulus values are: X=22.6, Y=12.8, Z=1.12, the hue value b=57.7, and the tinting strength at the standard depth of shade 1/25 according to DIN 53 235 is 0.145 (bluish red lead molybdate).

EXAMPLE 2e

In a 5-liter reactor, 5 g of sodium chloride and 5.2 g of lead nitrate are dissolved in 2400 ml of water. The temperature is adjusted to 20° C.±2° C. and the pH to 3.5±0.2. The lead molybdate crystals are formed by adding 3.8 g of sodium molybdate ($Na_2MoO_4.2H_2O$) in 80 ml of water, with efficient stirring. Then 10.0 g of barium chloride ($BaCl_2$) are added to the suspension. Into the resultant suspension are then run simultaneously, over 55 minutes and with efficient stirring, a solution of 184.8 g of lead nitrate in 580 ml of water and a solution of 75.4 g of sodium bichromate ($Na_2Cr_2O_7.2H_2O$) 14.0 g of 14.0 sodium molybdate ($Na_2MoO_4.2H_2O$), 1.8 g of sodium sulfate (anhydrous) and 21.0 g of 100% sodium hydroxide in 600 ml of water. During the mixing, the pH is adjusted to 2.4±0.05. During the addition the excess of lead nitrate is adjusted to 2.3 g of $Pb^{2+}$ per liter, and the temperature of both solutions is adjusted to 20° C.±2° C. After precipitation, the excess of lead nitrate is adjusted to 0.5 g of $Pb^{2+}$ per liter with the remaining sodium chromate/molybdate/sulfate solution (ca. 20 ml). Subsequently the resultant product is coated by addition of 21.5 g of neutral sodium silicate in 120 ml of water, followed by 17.6 g of sodium bicarbonate and then 17.6 g of $Al_2(SO_4)_3.14H_2O$ in 120 ml of water.

The final pH after addition of this solution is adjusted to 6.0-6.5. The precipitate is then isolated from the reaction medium by filtration, washed free from soluble salts, and dried at a temperature of 80°-90° C.

Composition of the mixed crystal: 84.1% of $PbCrO_4$, 2.0% of $PbSO_4$, and 13.9% of $PbMoO_4$.

Percentage of coating relative to the total weight of the pigment: 4.5%.

The tristimulus values are: X=22.1, Y=12.4, Z=1.15, the hue value b=55.8, and the tinting strength at the standard depth of shade 1/25 according to DIN 53 235 is 0.159.

EXAMPLE 3

In a 5-liter reaction vessel, 5 g of sodium chloride and 3.8 g of sodium molybdate ($Na_2MoO_4x2H_2O$) are dissolved in 2400 ml of water. The temperature is adjusted to 20° C.±2° C. and the pH to 4.0±0.2. The lead molybdate seed crystals are formed by adding 14 g of lead nitrate (dissolved in 100 ml of water) with efficient stirring. A solution of 184.8 g of lead nitrate in 580 ml of water and a solution of 75.4 g of sodium dichromate ($Na_2Cr_2O_7x2H_2O$), 14.0 g of sodium molybdate ($Na_2MoO_4x2H_2O$), 1.8 g of sodium sulfate (anhydrous) and 21.0 g of sodium hydroxide (NaOH 100%) in 600 ml of water are then simultaneously run over 55 minutes with efficient stirring into the suspension so obtained. During the mixing, the pH is adjusted to 3.7±0.1. During the addition, the excess of lead nitrate is adjusted to 2.3 g of $Pb^{2+}$ per liter and the temperature of the two solutions to 20° C.±2° C. After precipitation, the excess of lead nitrate is adjusted to 0.5 g of $Pb^{2+}$ per liter using the remaining sodium chromate/molybdate/sulfate solution (about 20 ml). The resulting product is then coated by the addition of 28 g of neutral silica in 120 ml of water, followed by 17.6 g of sodium bicarbonate and then 11.2 g of $Al_2(SO_4)_3x14H_2O$ in 120 ml of water, and finally a solution of 7.5 g of antimony (III) trioxide, 7.5 g of sodium fluoride and 20 g of 54% nitric acid in 120 ml of water.

After addition of this solution, the final pH is adjusted to 6.0-6.5. The precipitate is then isolated from the reaction medium by filtration, washed free from soluble salts and dried at a temperature of 80°-90° C. over a period of 18 hours.

Composition of the mixed crystal: 84.1% of $PbCrO_4$, 2.0% of $PbSO_4$ and 13.9% of $PbMoO_4$.

Percentage of the coating relative to the total weight of the pigment: 9%.

The tristimulus values are X 23.5, Y 13.8 and Z 1.03, the hue value b is 60.9 and the tinting strength at the standard depth of shade 1/25 according to DIN 53 235 is 0.079 (yellowish red lead molybdate).

EXAMPLE 3a

The process according to Example 3 above is repeated, except that the pH during the mixing is adjusted to 3.1±0.1 instead of 3.7±0.1.

Composition of the mixed crystal so obtained: 84.1% of $PbCrO_4$, 2.0% of $PbSO_4$ and 13.9% of $PbMoO_4$.

Percentage of the coating relative to the total weight of the pigment: 9%.

The tristimulus values are X 22.3, Y 13.0 and Z 1.14, the hue value b is 57.3 and the tinting strength at the standard depth of shade 1/25 according to DIN 53 235 is 0.111 (red lead molybdate).

EXAMPLE 3b

The process according to Example 3 above is repeated, except that the pH during the mixing is adjusted to 3.5±0.1 instead of 3.7±0.1.

Composition of the mixed crystal obtained and percentage of the coating as in Example 3.

The tristimulus values are X 23.3, Y 13.8 and Z 1.19, the hue value b is 58.8 and the tinting strength at the standard depth of shade 1/25 according to DIN 53 235 is 0.086 (red lead molybdate).

EXAMPLE 3c

The process according to Example 3 above is repeated, except that the pH during the mixing is adjusted to 3.3±0.1 instead of 3.7±0.1.

Composition of the mixed crystal so obtained: 84.1% of $PbCrO_4$, 2.0% of $PbSO_4$ and 13.9% of $PbMoO_4$.

Percentage of the coating relative to the total weight of the pigment: 9%.

The tristimulus values are X 22.6, Y 13.3 and Z 1.17, the hue value b is 57.3 and the tinting strength at the standard depth of shade 1/25 according to DIN 53 235 is 0.100 (red lead molybdate).

EXAMPLE 4

In a 5-liter reaction vessel, 5 g of sodium chloride and 14.0 g of lead nitrate are dissolved in 2400 ml of water. The temperature is adjusted to 20° C.±2° C. and the pH to 4.0±0.2. The lead molybdate seed crystals are formed by adding 3.8 g of sodium molybdate ($Na_2MoO_4x2H_2O$) in 80 ml of water with efficient stirring. A solution of 184.8 g of lead nitrate in 580 ml of water and a solution of 75.4 g of sodium dichromate ($Na_2Cr_2O_7x2H_2O$), 14.0 g of sodium molybdate ($Na_2MoO_4x2H_2O$), 1.8 g of sodium sulfate (anhydrous) and 21.0 g of sodium hydroxide (100%) in 600 ml of water are then simultaneously run over 55 minutes with efficient stirring into the suspension so obtained. During the mixing, the pH is adjusted to 3.7±0.1. During the addition, the excess of lead nitrate is adjusted to 2.3 g of $Pb^{2+}$ per liter and the temperature of the two solutions to 20°

C.±2° C. After precipitation, the excess of lead nitrate is adjusted to 0.5 g of Pb$^{2+}$ per liter using the remaining sodium chromate/molybdate/sulfate solution (about 20 ml). The resulting product is then coated. Then 21.5 g of neutral silica in 120 ml of water are added, followed by the addition of 17.6 g of sodium bicarbonate and then 11.6 g of Al$_2$(SO$_4$)$_3$x14H$_2$O in 120 ml of water. A solution of 7.5 g of antimony trioxide, 7.5 g of sodium fluoride and 20.0 g of 54% nitric acid in 120 ml of water are then added.

After addition of this solution, the final pH is adjusted to 6.0–6.5. The precipitate is then isolated from the reaction medium by filtration, washed free freom soluble salts and dried at a temperature of 80°–90° C. over a period of 18 hours.

Composition of the mixed crystal so obtained: 84.1% of PbCrO$_4$, 2.0% of PbSO$_4$ and 13.9% of PbMoO$_4$.

Percentage of the coating relative to the total weight of the pigment: 9%.

The tristimulus values are X 23.4, Y 14.0 and Z 1.22, the hue value b is 59.8 and the tinting strength at the standard depth of shade 1/25 according to DIN 53 235 is 0.069 (yellowish red lead molybdate).

EXAMPLE 4a

The process according to Example 4 above is repeated, except that the pH during the mixing is adjusted to 3.1±0.1 instead of 3.7±0.1.

Composition of the mixed crystal so obtained: 84.1% of PbCrO$_4$, 2.0% of PbSO$_4$ and 13.9% of PbMoO$_4$.

Percentage of the coating relative to the total weight of the pigment: 9%.

The tristimulus values are X 23.3, Y 13.8 and Z 1.15, the hue value b is 59.3 and the tinting strength at the standard depth of shade 1/25 according to DIN 53 235 is 0.089 (red lead molybdate).

EXAMPLE 4b

The process according to Example 4 is repeated, except that the pH during the mixing is adjusted to 3.5±0.1 instead of 3.7±0.1.

Composition of the mixed crystal obtained and percentage of the coating: as in Example 4.

The tristimulus values are X 23.3, Y 13.9 and Z 1.24, the hue value b is 58.4 and the tinting strength at the standard depth of shade 1/25 according to DIN 53 235 is 0.078 (yellowish red lead molybdate).

EXAMPLE 4c

The process according to Example 4 is repeated, except that the pH during the mixing is adjusted to 3.3±0.1 instead of 3.7±0.1.

Composition of the mixed crystal so obtained: 84.1% of PbCrO$_4$, 2.0% of PbSO$_4$ and 13.9% of PbMoO$_4$.

Percentage of the coating relative to the total weight of the pigment: 9%.

The tristimulus values are X 23.0, Y 13.6 and Z 1.21, the hue value b is 58.1 and the tinting strength at the standard depth of shade 1/25 according to DIN 53 235 is 0.085 (red lead molybdate).

EXAMPLE 4d

In a 5-liter reactor, 5 g of sodium chloride and 5.2 g of lead nitrate are dissolved in 2400 ml of water. The temperature is adjusted to 20° C.±2° C. and the pH to 3.5±0.2. The lead molybdate crystals are formed by adding 3.8 g of sodium molybdate (Na$_2$MoO$_4$.2H$_2$O) in 80 ml of water, with efficient stirring. Then 10.0 g of barium chloride (BaCl$_2$) are added to the suspension. Into the resultant suspension are then run simultaneously, over 55 minutes and with efficient stirring, a solution of 184.8 g of lead nitrate in 580 ml of water and a solution of 75.4 g of sodium bichromate (Na$_2$Cr$_2$O$_7$.2H$_2$O), 14.0 g of sodium molybdate (Na$_2$MoO$_4$.2H$_2$O), 1.8 g of sodium sulfate (anhydrous) and 21.0 g of 100% sodium hydroxide in 600 ml of water. During the mixing, the pH is adjusted to 2.6±0.05. During the addition the excess of lead nitrate is adjusted to 2.3 g of Pb$^{2+}$ per liter, and the temperature of the two solutions is adjusted to 20° C.±2° C. After precipitation, the excess of lead nitrate is adjusted to 0.5 g of Pb$^{2+}$ per liter with the remaining sodium chromate/molybdate/sulfate solution (ca. 20 ml). Subsequently the resultant product is coated by addition of 21.5 g of neutral sodium silicate in 120 ml of water, followed by 17.6 g of sodium bicarbonate and then 17.6 g of Al$_2$(SO$_4$)$_3$.14H$_2$O in 120 ml of water.

The final pH after addition of this solution is adjusted to 6.0–6.5. The precipitate is then isolated from the reaction medium by filtration, washed free from soluble salts, and dried at a temperature of 80°–90° C.

Composition of the mixed crystal: 84.1% of PbCrO$_4$, 2.0% of PbSO$_4$, and 13.9% of PbMoO$_4$.

Percentage of coating relative to the total weight of the pigment: 4.5%.

The tristimulus values are: X=21.0, Y=12.1, Z=1.14, the hue value b=55.0, and the tinting strength at the standard depth of shade 1/25 according to DIN 53 235 is 0.146 (bluish red lead molybdate).

EXAMPLE 4e

In a 5-liter reactor, 5 g of sodium chloride and 5.2 g of lead nitrate are dissolved in 2400 ml of water. The temperature is adjusted to 20° C.±2° C. and the pH to 3.5±0.2. The lead molybdate crystals are formed by adding 3.8 g of sodium molybdate (Na$_2$MoO$_4$.2H$_2$O) in 80 ml of water, with efficient stirring. Then 10.0 g of barium chloride (BaCl$_2$) are added to the suspension. Into the resultant suspension are then run simultaneously, over 55 minutes and with efficient stirring, a solution of 184.8 g of lead nitrate in 580 ml of water and a solution of 75.4 g of sodium bichromate (Na$_2$Cr$_2$O$_7$.2H$_2$O), 14.0 g of sodium molybdate (Na$_2$MoO$_4$.2H$_2$O), 1.8 g of sodium sulfate (anhydrous) and 21.0 g of 100% sodium hydroxide in 600 ml of water. During the mixing, the pH is adjusted to 2.4±0.05. During the addition the excess of lead nitrate is adjusted to 2.3 g of Pb$^{2+}$ per liter, and the temperature of the two solutions is adjusted to 20° C.±2° C. After precipitation, the excess of lead nitrate is adjusted to 0.5 g of Pb$^{2+}$ per liter with the remaining sodium chromate/molybdate/sulfate solution (ca. 20 ml). Subsequently the resultant product is coated by addition of 21.5 g of neutral sodium silicate in 120 ml of water, followed by 17.6 g of sodium bicarbonate and then 17.6 g of Al$_2$(SO$_4$)$_3$.14H$_2$O in 120 ml of water.

The final pH after addition of this solution is adjusted to 6.0–6.5. The precipitate is then isolated from the reaction medium by filtration, washed free from soluble salts, and dried at a temperature of 80°–90° C.

Composition of the mixed crystal: 84.1% of PbCrO$_4$, 2.0% of PbSO$_4$, and 13.9% of PbMoO$_4$.

Percentage of coating relative to the total weight of the pigment: 4.5%.

The tristimulus values are: X=19.4, Y=11.1, Z=1.18, the hue value b=51.7, and the tinting strength at the standard depth of shade 1/25 according to DIN 53 235 is 0.187 (bluish red lead molybdate).

EXAMPLE 5

(Application in Letterpress Printing)

1 g of the lead molybdate pigment obtained in Example 2, 2a, 2d, 2e, 4, 4a, 4d or 4e is finely ground in an Engelsmann grinding machine with 4.0 g of a litho varnish of the composition:
  29.4% of linseed oil-stand oil (300 poise)
  67.2% of linseed oil-stand oil (20 poise)
  2.1% of cobalt octoate (8% Co) and
  1.3% of lead octoate (25% Pb).

Using a stereotype block, this varnish is printed in an amount of 1 g/m² on art paper by letterpress printing. A strong yellowish red (Examples 2 and 4), an orange (Examples 2a and 4a) or a red coloration (Examples 2d, 2e, 4d and 4e) of good tinting strength and good gloss is obtained.

The pigment is also suitable for other printing methods, such as intaglio printing, offset printing, flexographic printing, with equally good results.

EXAMPLE 6

(Application in PVC)

0.6 g of the pigment obtained in Examples 2, 2a, 2d, 2e, 4, 4a, 4d or 4e is mixed with 76 g of polyvinyl chloride, 33 g of dioctyl phthalate, 2 g of dibutyl tin dilaurate and 2 g of titanium dioxide and the mixture is processed to a thin sheet for 15 minutes at 160° C. on a roll bank. The yellowish red (Examples 2 and 4), orange (Examples 2a and 4a) or red coloration (Examples 2d, 2e, 4d and 4e) obtained is strong and fast to migration and light.

EXAMPLE 7

(Application in Polystyrene)

0.05 of the pigment obtained in Example 2, 2a, 2d, 2e, 4, 4a, 4d or 4e is mixed dry with 100 g of polystyrene. The mixture is kneaded in the temperature range from 180°–220° C. until a homogeneous coloration is obtained. The coloured plastic material is cooled and then ground in a mill to a particle size of about 2 to 4 mm.

The granular formulation so obtained is processed in an injection moulding machine to moulded articles in the temperature range from 220°–300° C. The products are coloured in a yellowish red (Examples 2 and 4), orange (Examples 2a and 4a) or red (Examples 2d, 2e, 4d and 4e) coloration of good lightfastness and good thermal stability.

EXAMPLE 8

(Application in an Alkyd Melamine Varnish)

The following mixture is prepared: 60 g of a 60% solution of a non-drying alkyd resin in xylene (available from Reichold-Albert-Chemie under the registered trademark Beckosol® 27-320), 36 g of a 50% solution of a melamine/formaldehyde resin in a mixture of alcohol and aromatics (available from Reichold-Albert-Chemie under the registered trademark Super-Beckamin® 13-501), 2 g of xylene and 2 g of methyl cellosolve. 100 g of this mixture is stirred with a stirrer to give a homogeneous varnish solution. 95 g of the clear lacquer so obtained and 5 g of the pigment of Example 2, 2a, 2d, 2e, 4, 4a, 4d or 4e are dispersed for 72 hours in a ball mill. The coloured lacquer is then applied to metal by a conventional spraying method and stoved for 30 minutes at 120° C. A yellowish red (Examples 2 and 4), orange (Examples 2a and 4a) and red (Examples 2d, 2e, 4d and 4e) finish of good lightfastness is obtained.

What is claimed is:

1. In a process for the preparation of a lead molybdate pigment containing lead chromate, lead sulfate, and lead molybdate by (a) reaction of an aqueous solution of a lead salt with an aqueous solution containing chromate, molybdate and sulfate salts or (b) reaction of an aqueous solution of a lead salt with an aqueous solution of chromate salt, an aqueous solution of molybdate salt and an aqueous solution of sulfate salt, the improvement comprising
    conducting said reaction in the presence of 2 to 5 mol % lead molybdate seed crystals based on the total molar amount of lead chromate, lead sulfate, and lead molybdate while keeping the pH in the acid range.

2. A process according to claim 1, comprising conducting said reaction in the presence of 3 to 4 mol % of lead molybdate seed crystals.

3. A process according to claim 1, which comprises charging 2 to 5 mol % of lead molybdate seed crystals as an aqueous suspension to a reactor and then introducing an aqueous lead salt solution and an aqueous solution containing a water-soluble chromate, sulfate and molybdate salt into the reactor, with efficient stirring, simultaneously through two separate lines.

4. A process according to claim 3, wherein the solution containing chromate, sulfate and molybdate salts contains 10 to 12 mol % of lead molybdate, based on the total molar amount of lead chromate, lead sulfate and lead molybdate.

5. A process according to claim 1, wherein the lead molybdate seed crystals are finely particulate, uniform seed crystals.

6. A process according to claim 1, wherein the lead salt is lead nitrate, the chromate salt is sodium chromate, the sulfate salt is sodium sulfate and the molybdate salt is sodium molybdate.

7. A process according to claim 1, further comprising producing a coating of an inorganic coating compound on the molybdate pigment during or after the preparation or by an aftertreatment.

8. Organic material of high molecular weight containing a lead molybdate pigment as obtained in claim 1.

9. A red lead molybdate pigment containing lead chromate and lead sulfate and having a lead sulfate content $\leq 10$ mol % and a lead molybdate content of 9 to 15 mol %, based on the total molar amount of lead chromate, lead molybdate, and lead sulfate, which pigment is characterized by the tristimulus values X, Y and Z determined in accordance with DIN 5033 which lie within the color space bounded by the coordinates $22.7 \leq X \leq 25.9$, $12.9 \leq Y \leq 15.1$ and $1.12 \leq Z \leq 1.46$ which lead molybdate pigment has been prepared in a pH range of 2.8–3.3 and in the presence of 2 to 5 mol % of lead molybdate seed crystals, based on the total molar amount of lead chromate, lead sulfate, and lead molybdate, and which has, as colorimetric parameters, a tinting strength value C at standard depth of shade 1/25 in accordance with DIN 53 235 and a hue value b determined in accordance with DIN 6174 that lies within the area defined by the following coordinates:
  C=0.077 at b=58.4,
  C=0.122 at b=55.9,
  C=0.096 at b=64.6 and C=0.060 at b=64.6.

10. A yellowish red lead molybdate pigment containing lead chromate and lead sulfate and having a lead sulfate content ≦10 mol % and a lead molybdate content of 9 to 15 mol %, based on the total molar amount of lead chromate, lead molybdate, and lead sulfate, which pigment is coated with antimony(III) and is characterized by the tristimulus values X, Y and Z determined in accordance with DIN 5033 which lie within the color space bounded by the coordinates c, 23.3≦X≦24.9, 13.8≦Y≦14.6 and 1.02≦Z≦1.30, which lead molybdate pigment has been prepared in a pH range of 3.4–4.0 and in the presence of 2 to 5 mol % of lead molybdate seed crystals, based on the total molar amount of lead chromate, lead sulfate, and lead molybdate, and which has, as colorimetric parameters, a tinting strength value C at standard depth of shade 1/25 in accordance with DIN 53 235 and a hue value b determined in accordance with DIN 6174 that lies within the area defined by the following coordinates:
  C=0.083 at b=57.4,
  C=0.078 at b=62.2,
  C=0.061 at b=62.2 and
  C=0.063 at b=58.4.

11. A red lead molybdate pigment containing lead chromate and lead sulfate and having a lead sulfate content ≦10 mol % and a lead molybdate content of 9 to 15 mol %, based on the total molar amount of lead chromate, lead molybdate, and lead sulfate, which pigment is coated with antimony(III) and is characterized by tristimulus values X, Y and Z determined in accordance with DIN 5033 which lie within the color space bounded by the coordinates 22.2≦X≦23.3, 12.8≦Y≦13.8 and 1.10≦Z≦1.36, which lead molybdate pigment has been prepared in a pH range of 2.8–3.3 and in the presence of 2 to 5 mol % of lead molybdate seed crystals, based on the total molar amount of lead chromate, lead sulfate, and lead molybdate, and which has, as colorimetric parameters, a tinting strength value C at standard depth of shade 1/25 in accordance with DIN 53 235 and a hue value b determined in accordance with DIN 6174 that lies within the area defined by the following coordinates:
  C=0.120 at b=55.1,
  C=0.114 at b=61.4,
  C=0.079 at b=61.4 and
  C=0.083 at b=57.4.

12. A bluish red lead molybdate pigment containing lead chromate and lead sulfate and having a lead sulfate content ≦10 mol % and a lead molybdate content of 9 to 15 mol %, based on the total molar amount of lead chromate, lead molybdate, and lead sulfate, which pigment is coated with antimony(III) and is characterized by the tristimulus values X, Y and Z determined in accordance with DIN 5033 which lie within the color space bounded by the coordinates 18.5≦X≦22.2, 10.5≦Y≦12.8 and 1.10≦Z≦1.35, which lead molybdate pigment has been prepared in a pH range of 2.2–2.7 and in the presence of 2 to 5 mol % of lead molybdate seed crystals, based on the total molar amount of lead chromate, lead sulfate, and lead molybdate, and which has, as colorimetric parameters, a tinting strength value C at standard depth of shade 1/25 in accordance with DIN 53 235 and a hue value b determined in accordance with DIN 6174 that lies within the area defined by the following coordinates:
  C=0.120 at b=55.1,
  C=0.118 at b=57.2,
  C=0.220 at b=49.0 and
  C=0.215 at b=51.5.

* * * * *